US010333901B1

(12) United States Patent
Bauman et al.

(10) Patent No.: US 10,333,901 B1
(45) Date of Patent: Jun. 25, 2019

(54) POLICY BASED DATA AGGREGATION

(71) Applicant: Amazon Technologies, Inc., Reno, NV (US)

(72) Inventors: Daniel Bauman, Western Cape (ZA); Willem Jacob Buys, Western Cape (ZA); Joshua Dawie Mentz, Western Cape (ZA); Aidan Musnitzky, Western Cape (ZA); Timothy Ralph Sjoberg, Western Province (ZA); Ross Bevan Engers, Western Cape (ZA); Ronen Dov Agranat, Western Cape (ZA); Brian Frederick Mulder, Western Cape (ZA); Stefan Letz, Western Cape (ZA)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/483,069

(22) Filed: Sep. 10, 2014

(51) Int. Cl.
*H04L 29/06* (2006.01)
*G06F 21/62* (2013.01)

(52) U.S. Cl.
CPC ...... *H04L 63/0421* (2013.01); *G06F 21/6281* (2013.01); *H04L 63/20* (2013.01); *G06F 2221/2129* (2013.01)

(58) Field of Classification Search
USPC ........................................................... 726/1
See application file for complete search history.

(56) References Cited

U.S. PATENT DOCUMENTS

| 8,793,805 | B1 * | 7/2014 | Johansson | H04L 63/0421 726/26 |
| 2008/0104712 | A1 * | 5/2008 | Oliver | G06F 21/6227 726/27 |
| 2008/0222734 | A1 * | 9/2008 | Redlich | G06F 21/577 726/26 |
| 2008/0287118 | A1 * | 11/2008 | Seppanen | H04L 9/0637 455/423 |
| 2009/0049511 | A1 * | 2/2009 | Manickam | G06F 21/6254 726/1 |
| 2009/0063869 | A1 * | 3/2009 | Kohavi | G06F 21/53 713/189 |
| 2009/0282036 | A1 * | 11/2009 | Fedtke | G06F 21/6254 |
| 2010/0192220 | A1 * | 7/2010 | Heizmann | G06F 11/3664 726/19 |
| 2011/0219424 | A1 * | 9/2011 | Panasyuk | G06F 21/606 726/1 |

(Continued)

*Primary Examiner* — Farid Homayounmehr
*Assistant Examiner* — Thanh T Le
(74) *Attorney, Agent, or Firm* — Klarquist Sparkman, LLP

(57) ABSTRACT

A method for data aggregation of declassified sensitive data may include obtaining a policy associated with an isolated region of a service provider. The policy may identify a plurality of rules for declassifying sensitive data accessible within the isolated region. At least a portion of the plurality of rules identified by the policy may be obtained. A file with the sensitive data may be identified, the file being generated within the isolated region. An output file may be generated based on applying the obtained rules to the file. At least a portion of the sensitive data may be filtered out using the obtained rules. The generated output file may be provided for access outside of the isolated region. The sensitive data may be inaccessible by at least another region of the service provider.

19 Claims, 12 Drawing Sheets

(56) References Cited

U.S. PATENT DOCUMENTS

| | | | |
|---|---|---|---|
| 2011/0239269 A1* | 9/2011 | Wahl | H04L 63/0815 726/1 |
| 2012/0046972 A1* | 2/2012 | Tonti | G06F 19/321 705/3 |
| 2012/0110680 A1* | 5/2012 | Oliver | H04L 63/102 726/30 |
| 2012/0221955 A1* | 8/2012 | Raleigh | H04M 15/00 715/736 |
| 2012/0259877 A1* | 10/2012 | Raghunathan | G06F 21/6254 707/757 |
| 2013/0282679 A1* | 10/2013 | Khin | G06F 16/258 707/698 |
| 2013/0297501 A1* | 11/2013 | Monk | G06Q 20/405 705/40 |
| 2014/0026179 A1* | 1/2014 | Devarajan | G06F 21/51 726/1 |
| 2014/0047551 A1* | 2/2014 | Nagasundaram | G06F 21/60 726/26 |
| 2014/0123303 A1* | 5/2014 | Shukla | G06F 21/6254 726/26 |
| 2014/0157349 A1* | 6/2014 | Robinson | G06K 9/00228 726/1 |
| 2014/0157370 A1* | 6/2014 | Plattner | G06F 21/6245 726/4 |
| 2014/0351943 A1* | 11/2014 | Gianniotis | G06F 21/6254 726/26 |
| 2015/0067881 A1* | 3/2015 | Badstieber | G06F 16/13 726/26 |
| 2015/0135254 A1* | 5/2015 | Thilenius | H04L 63/02 726/1 |
| 2015/0381596 A1* | 12/2015 | Johnson | H04L 63/0272 726/6 |
| 2016/0132697 A1* | 5/2016 | Simske | G06F 21/6254 726/26 |

* cited by examiner

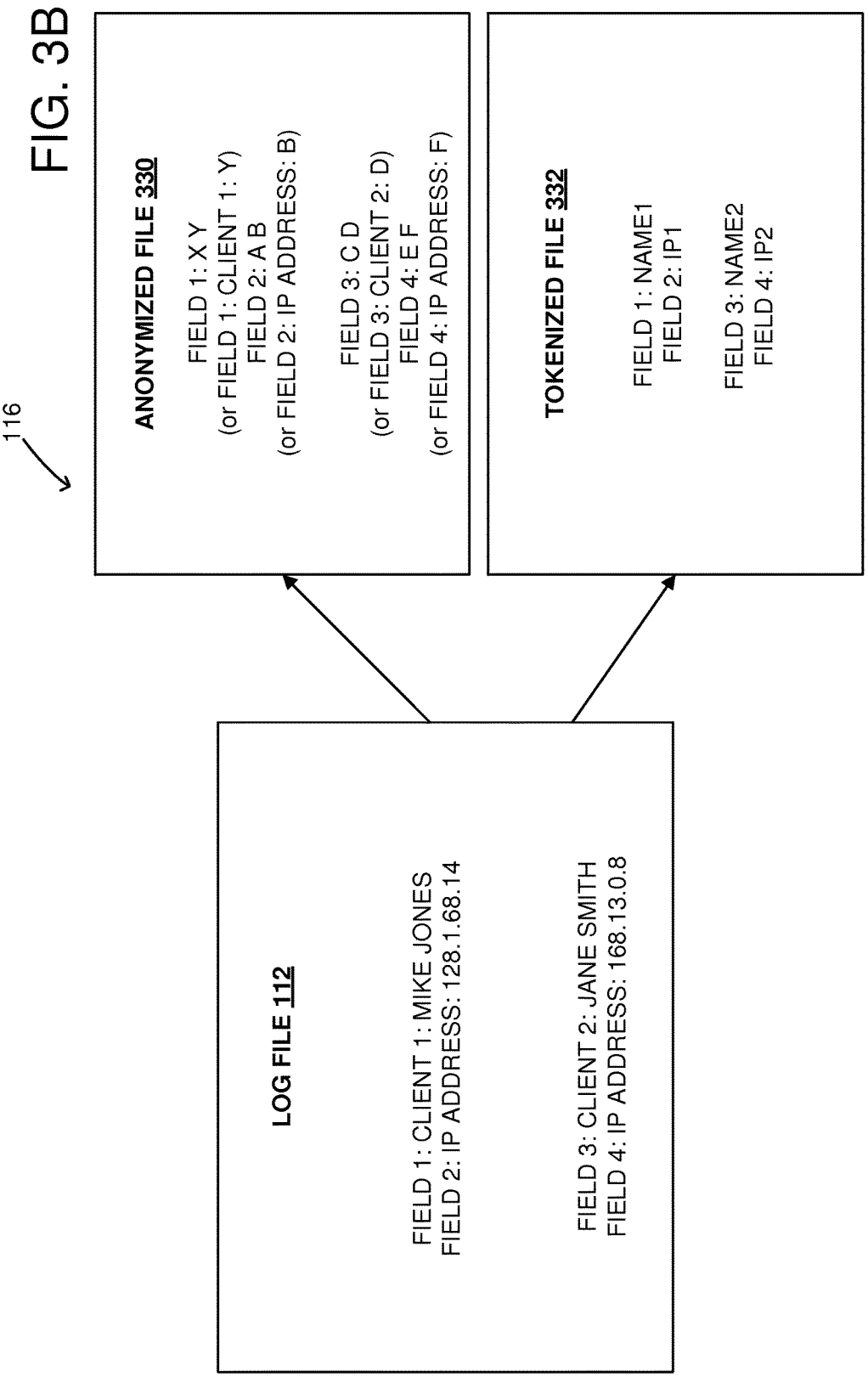

POLICY BASED DATA AGGREGATION

BACKGROUND

Networks, such as public and/or private networks, can be large and complicated. For example, the network architecture of a large company may span many locations, such as data centers, cities, states, countries, and continents. Furthermore, the network architecture of a large company may be divided into a variety of different structures, each of which may provide different services external and/or internal to the company. One or more portions of such network architectures may be implemented in a cloud environment with cloud computing functionalities.

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Configuring network services to operate efficiently in a cloud computing environment can be a difficult task, especially if access to sensitive data files is required for the network services configuration.

BRIEF DESCRIPTION OF THE DRAWINGS

FIG. 3B is a block diagram illustrating anonymization and tokenization of file data during a policy based data aggregation, in accordance with an example embodiment of the disclosure.

DETAILED DESCRIPTION

Figure 1:
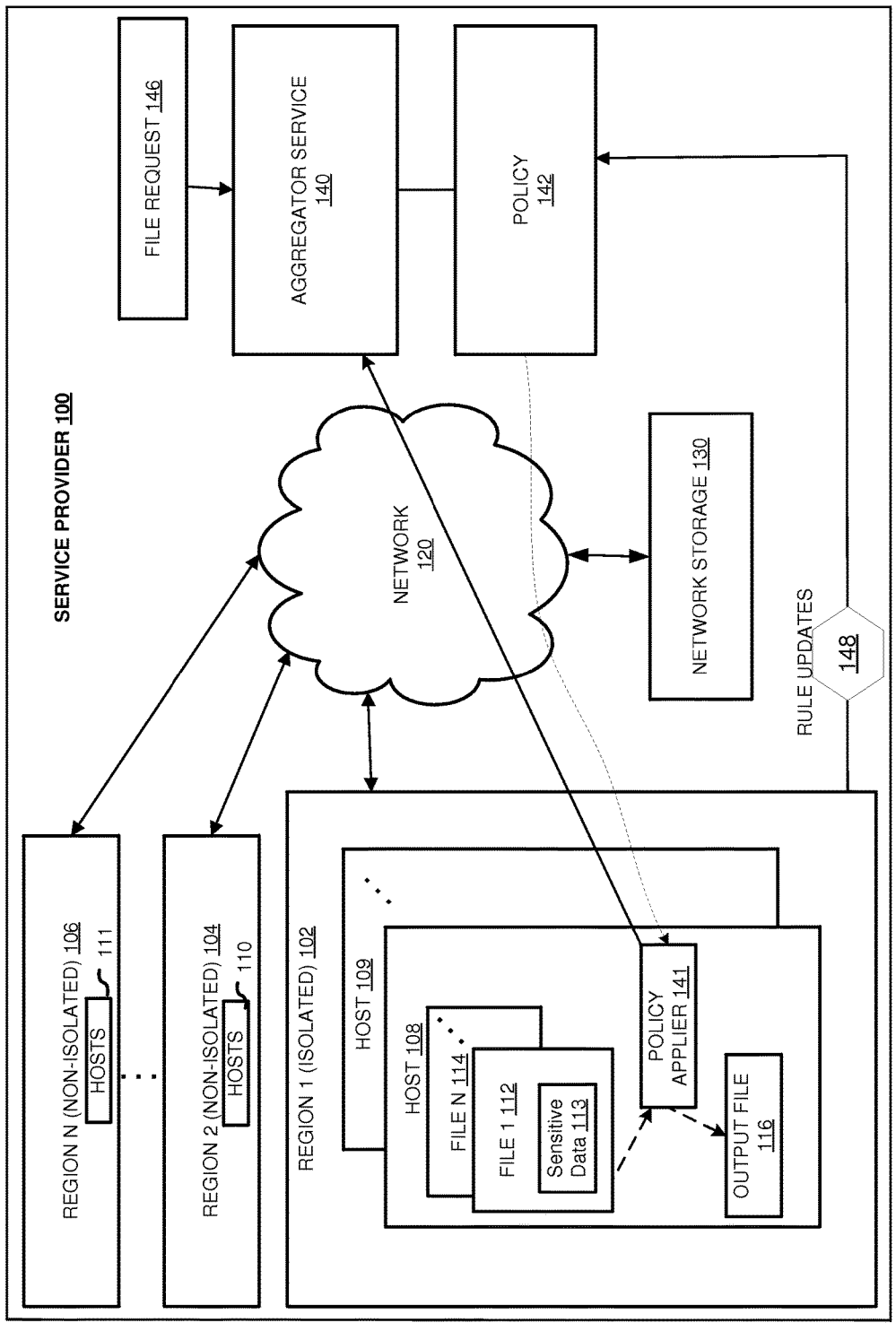
FIG. 1 is a network diagram illustrating policy based data aggregation in a compute service environment, in accordance with an example embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

As described herein, various techniques and solutions can be applied for policy based data aggregation. More specifically, a rule (or policy) based data aggregator service may be used within a restricted area of a network environment (e.g., an isolated region or a private network/cloud of a computer service provider environment) for filtering (or generalizing) confidential data (e.g., log file data, performance metrics data and so forth) into a form, which can be declassified (i.e., made non-confidential and available to areas outside of the restricted area). More specifically, a file may have a declassification policy associated with it, and the policy may include one or more rules (e.g., one or more anonymization rules and/or one or more tokenization rules) for identifying classified (or confidential) information within the file and removing (or substituting) such information in accordance with the rules.

As used herein, the terms "virtual machine" and "virtual machine instance" are interchangeable.

As used herein, the term "service provider" can refer to a cloud provider capable of delivering computing and storage capacity, databases, as a service to one or more end recipients. The service provider can be established for an organization by, or on behalf of, the organization (that is, the service provider may offer a "private cloud environment"). In other instances, the service provider can support a multi-tenant environment, where a plurality of customers operate independently (i.e., a public cloud environment). In this regard, the plurality of customers (e.g., multiple enterprises) can pay to use resources, such as server computers, databases, storage, etc., within the multi-tenant environment.

As used herein, the term "enterprise-based network" (or "enterprise private network" or "enterprise network") can refer to the network of computer systems that are owned by an enterprise (e.g., a corporation or another business). Typically, information access within the enterprise-based network is limited to employees of the company. In that sense, the enterprise network is a single-tenant system. However, data can be available to external users through an enterprise portal, such as a web interface. Typically, server computers in the enterprise network are not rentable by third parties.

As used herein, the term "cluster" refers to a group of hosts (e.g., computing devices of various types, such as web servers, database servers, networking equipment, etc.) that are located in a particular geographical area. For example, a cluster may refer to a group of hosts located in a data center in a particular city (e.g., a group of hosts located in a data center at, or near, Los Angeles can be called the Los Angeles cluster). In some implementations, a network service is available from a number of clusters. For example, a business or organization may operate hosts in a number of different clusters (e.g., a San Francisco cluster, a Los Angeles cluster, a London cluster, etc.). Computing devices (e.g., servers) that are associated with a network service (e.g., an aggregator service as disclosed herein) can be located in one or more of the different clusters of the business or organization.

In some implementations, computing devices that provide a network service are organized in different ways. As used herein, the term "region" may refer to a geographic region, and computing devices can be organized by such geographical region (e.g., a city, state, country, continent, etc.). For example, computing devices associated with an aggregator service can be grouped into regions including a North America region, a Europe region, an Asia region, etc. In some implementations, combinations of grouping (e.g., cluster and region) can be used.

As used herein, the term "region" may also refer to an isolated region within a network environment (e.g., a virtual private cloud or private network within a network environment). For example, a client (e.g., a government agency) may move sensitive workloads into a private cloud (or network), thereby addressing regulatory and compliance requirements that may be associated with the client. In this regard, a private cloud (or an isolated region) may be used in instances when access to file data generated within the client's private network is restricted (e.g., sensitive/confidential data files and so forth). One or more remaining regions within the network environment (i.e., other than an isolated region) may be referred to as non-isolated regions. A network administrator may be provided unrestricted access to data files (e.g., log files, performance metrics files, and resource monitoring metrics files) within the non-isolated regions. However, access by the network administrator to such data files associated with the isolated region (e.g., data files created within the isolated region) may be restricted as the data files may contain sensitive data.

As used herein, the terms "private cloud" and "private network" are interchangeable. As used herein, the terms "host server" and "host server computer" are interchangeable.

As used herein, the term "resource monitoring metrics" may include actual use of computing resources by an application (or a virtual machine used to run the application). For example, computing resources may be associated with one or more server computers hosting the application (or the virtual machine), and may include use of CPU resources, memory resources, available storage resources, disk I/O utilization, and so forth. The monitoring of such metrics may be performed over a determined (e.g., fixed) period of time, and an average value (with or without standard deviation adjustment) may be generated. Alternatively, a snapshot of such metrics may also be generated, which may be indicative of resource usage at a certain point in time.

As used herein, the term "performance metrics" may include one or more metrics or characteristics associated with the architecture of a host server (or a virtual machine hosted by the server). For example, a host server architecture may be characterized by one or more of the following performance metrics: CPU speed, memory capacity, storage capacity, network card characteristics (e.g., speed), video card characteristics (e.g., resolution and video processing speed), disk I/O speed, and so forth.

FIG. 1 is a network diagram illustrating policy based data aggregation in a compute service environment, in accordance with an example embodiment of the disclosure. Referring to FIG. 1, the service environment 100 (i.e., a cloud provider) may be capable of delivery of computing and storage capacity as a service to a community of end recipients. Further details about the computer service environment/provider are disclosed herein in reference to FIGS. 4-6. The compute service environment 100 includes a plurality of host server computers 108, . . . , 111, an aggregator service 140, and network storage 130, all communicatively coupled via the network 120.

Figure 3A:
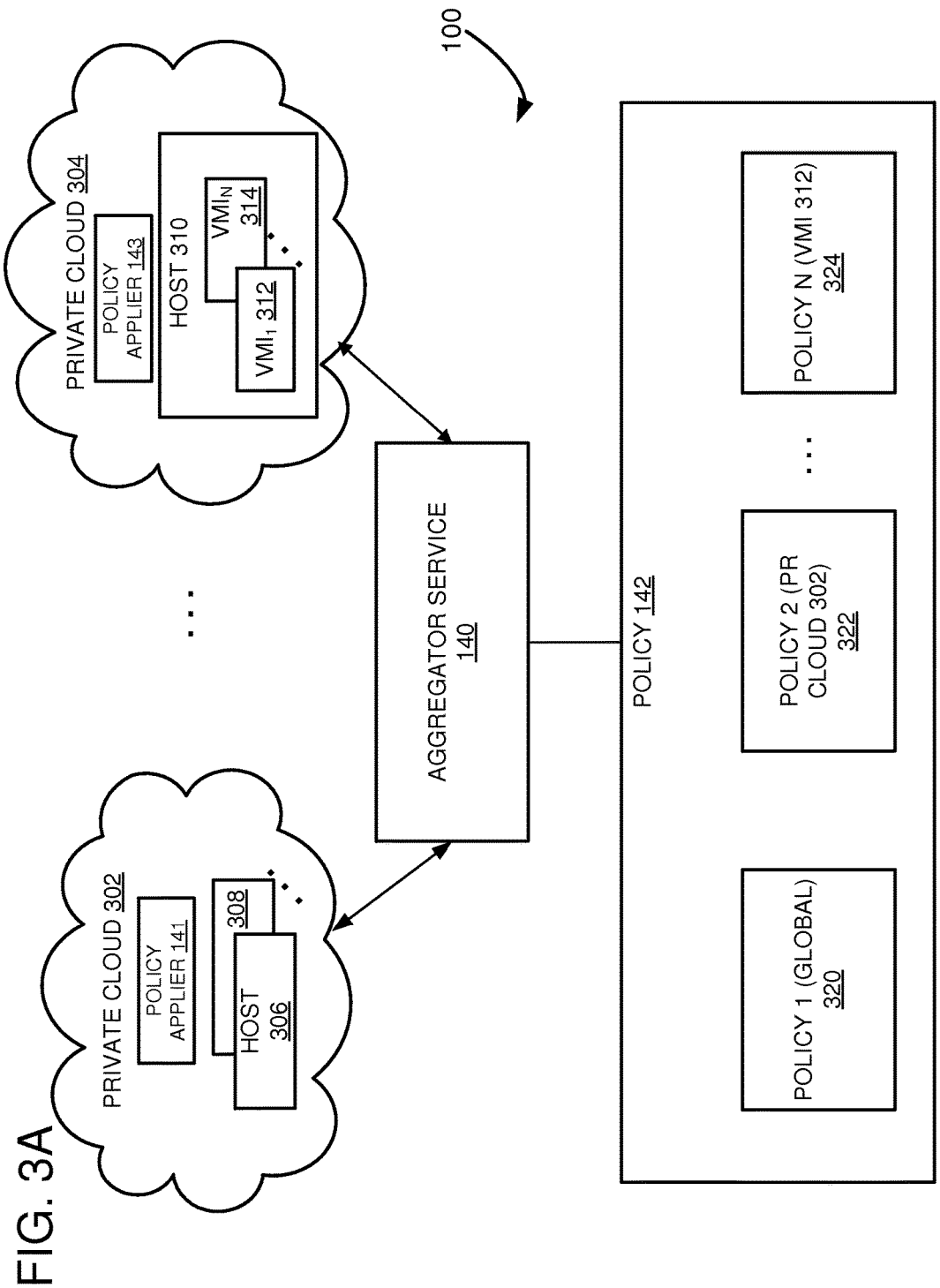
FIG. 3A is a diagram of a private cloud environment using a data aggregator service with a plurality of policies for filtering data files, in accordance with an example embodiment of the disclosure.
Figure 4:
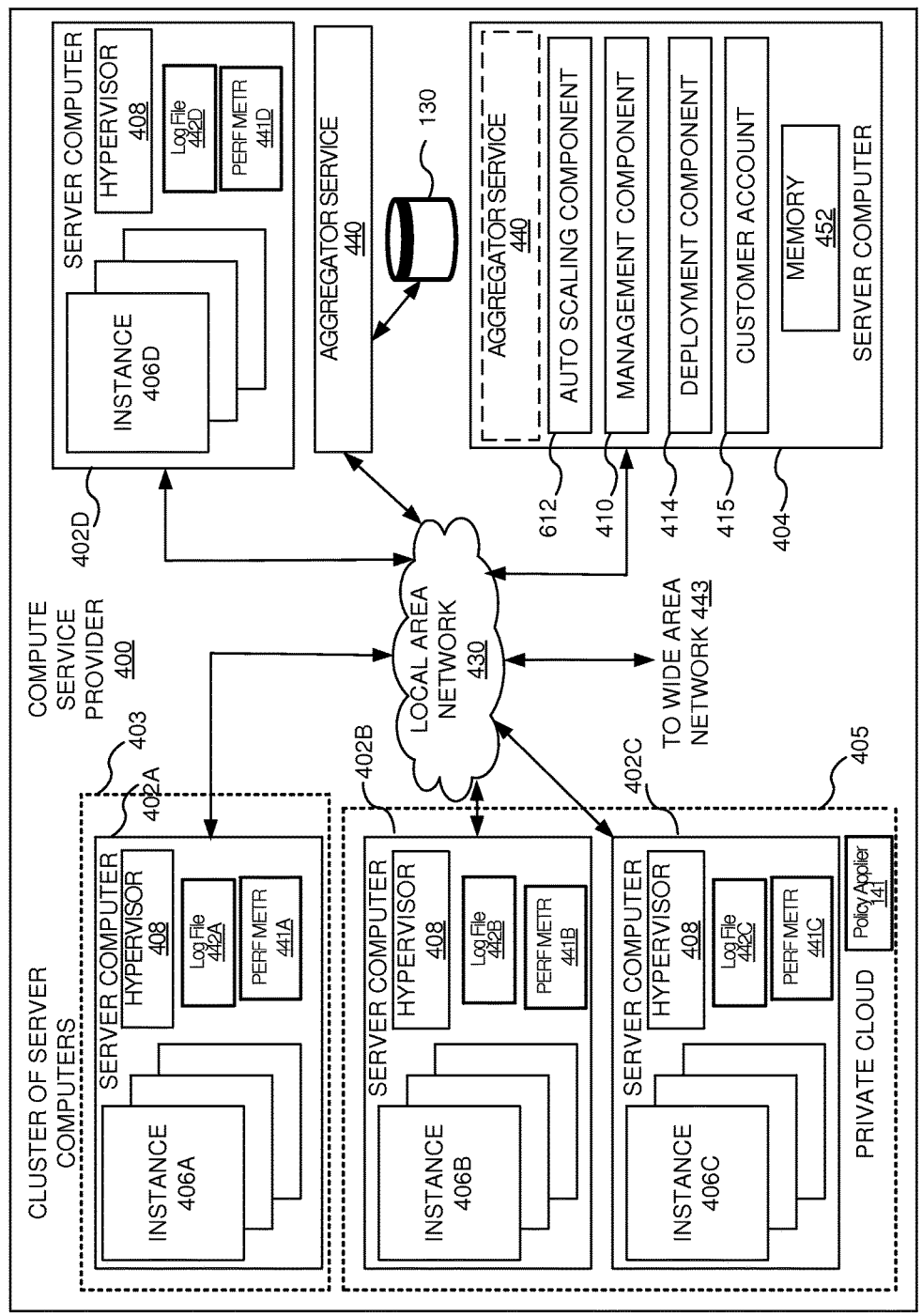
FIG. 4 is an example system diagram showing a plurality of virtual machine instances running in a multi-tenant environment using an aggregator service, in accordance with an example embodiment of the disclosure.

A host server computer (e.g., 108) may comprise a CPU, memory, and storage (not illustrated in FIG. 1), and may be configured to execute a hypervisor (e.g., as seen in FIG. 4) or another type of program configured to enable the execution of multiple virtual machine instances (VMIs) (e.g., as seen in FIGS. 3A and 4). Host servers 110, . . . , 111 may be located within respective non-isolated regions 104, . . . , 106. Host servers 108, . . . , 109 may be located within an isolated region 102. Each of the regions 102, . . . , 106 may represent a different geographic area, such as a different city, state, country, continent, etc. For example, each region could represent a cluster (e.g., a group of hosts in a particular data center) or another type of geographical area (e.g., state or country). The network 120 may comprise the Internet as well as any combination of a wired and/or wireless network, and can be used for communication between the regions, the network storage 130 and/or the aggregator service 140. In some implementations, other network connections may exist (e.g., direct or private network connections between regions and/or from regions to other networks).

The aggregator service 140 may comprise suitable logic, circuitry, interfaces, and/or code and may be operable to perform policy based data aggregation within the compute service provider 100. A policy applier 141 may be part of the aggregator service 140 and may be included in each of the isolated regions (e.g., 102) of the service provider 100. The aggregator service 140 may be operable to receive file requests (e.g., 146) for data. The policy applier 141 may detect such file request or the aggregator service 140 may notify the policy applier 141 of the received file request and the type of data that is being requested (e.g., a file 112 with sensitive data, which file has been created within the isolated region 102). The policy applier 141 may acquire a policy (e.g., 142) and determine which rules within the policy 142 are associated with the requested file 112. The policy applier 141 may then apply the determined declassification (or filtering) rules to the sensitive data 113 within the file 112 to generate the output file 116 with declassified/filtered data. The output file 116 may then be stored in network storage 130 or communicated back to the aggregator service 140, and the aggregator service 140 may communicate the file to a requesting server (e.g., located within one or more other regions, such as 104, . . . , 106). Alternatively, the output file 116 may be stored (e.g., in non-volatile memory or another storage) within the host server 108, making it available for access by another server within the isolated region 102 or by one or more servers within any of the non-isolated regions 104, . . . , 106.

One or more the files 112, . . . , 114 within the isolated region 102 (e.g., file 112) may have a declassification policy associated with it (e.g., policy 142 may be associated with the isolated region 102 and may be used for removing/replacing sensitive data to declassify any of the files 112, . . . , 114). The policy 142 may include one or more rules (e.g., one or more anonymization rules and/or one or more tokenization rules as discussed in reference to FIG. 3B) for identifying confidential (e.g., classified or sensitive) information (e.g., 113) within the file (e.g., 112) and removing (or substituting) such information in accordance with the rules to obtain non-confidential (e.g., declassified) file data (e.g., output file (e.g., 116).

In some implementations, the file 112 may include one or more log files, performance metrics files, and/or resource monitoring metrics files. The sensitive data 113 may include one or more of the following: information identifying the computing resources and capabilities of the server (e.g., 108) hosting the file 112; public and/or private Internet Protocol (IP) address of the host server 108; private and/or public IP address of one or more virtual machine instance (VMI) running on the host server 108; account identification (ID) of a customer account associated with the host server 108 (e.g., a customer account of a customer running one or more VMIs on the host server 108); customer ID information (e.g., name, address and any other personal or confidential information); customer email address; and/or DNS name (or any other private network host identification) for the host server 108.

In an example embodiment, file 112 may be a log file and may include a list of service requests containing names of hosts making requests for certain data fields (the host names and the data fields being considered as classified/sensitive data). The policy 142 may include rules that anonymize or tokenize the host names and the data fields (anonymization and tokenization is discussed in greater detail below in reference to FIG. 3B). For example, the policy 142 may include tokenization rules that substitute the host names and the data fields with representative tokens. The generated output file 116 may be considered a non-confidential file since it does not include the sensitive/classified host names and data fields, but it may still include metrics useful for network analysis. For example, due to the tokenization, the number of unique hosts, the number of different hosts accessing a service, and the number of hosts which access the service repeatedly may all be ascertained based on the tokens present in the output file 116. Additionally, the output file 116 may provide information on failures for specific data items, without knowing what the data type is.

In some implementations, the policy 142 may be created or periodically updated by an administrator within the isolated region 102 (assuming the policy 142 is associated with the isolated region 102). Additionally, one or more of the hosts 108, . . . , 109 within the isolated region 102 may provide policy rule updates 148, which may be posted to the rules 142. For example, the rule updates 148 may be used to specify additional tokenization and/or anonymization rules to be included in the policy 142, with the additional rules being specific (or applicable) to one or more specific host servers selected from the hosts servers 108, . . . , 109 and/or to any host server within the isolated region 102, and/or to any region (isolated or non-isolated) within the service provider 100.

Figure 2A:
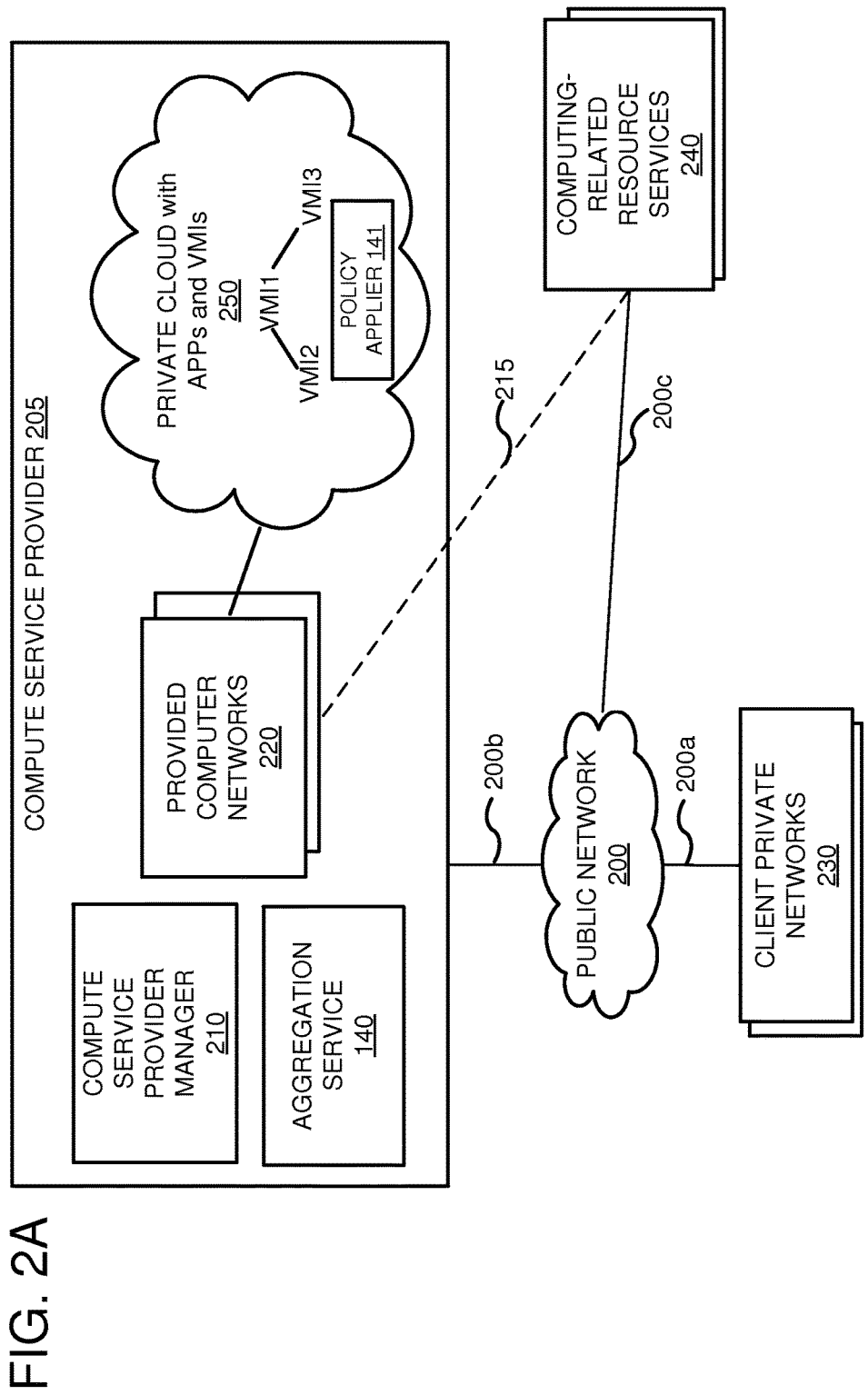
FIGS. 2A and 2B are network diagrams illustrating example embodiments of interactions that involve remote clients creating and configuring private computer networks that support policy based data aggregation.
Figure 2B:
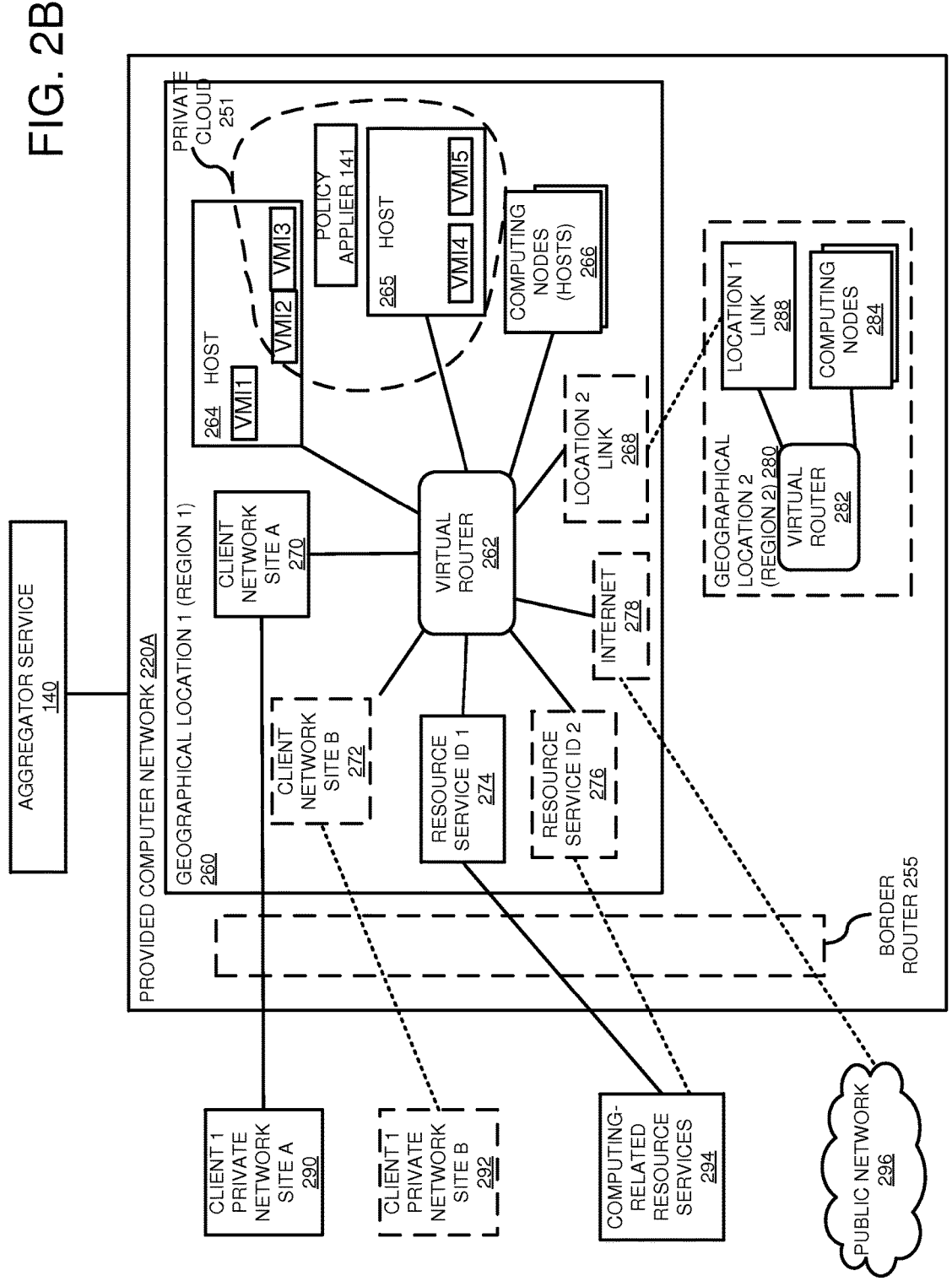

FIGS. 2A and 2B are network diagrams illustrating example embodiments of interactions that involve remote clients creating and configuring private computer networks that support policy based data aggregation. FIG. 2A is a network diagram illustrating an example embodiment of a compute service provider 205 that enables remote clients to create and configure computer networks for use by the clients. In this example, the computer networks that are created and configured are private network extensions to existing private computer networks of clients, and a compute service provider 205 provides such functionality to clients (not shown) over one or more public networks 200 (e.g., over the Internet). Thus, the remote clients may use the compute service provider ("CSP") 205 to dynamically modify the size and/or capabilities of their private computer networks, such as by using cloud computing techniques over the public networks 200.

In particular, in the example of FIG. 2A, a number of clients (not shown) are interacting over a public network 200 with a CSP Manager module 210 to create and configure various private computer network extensions 220 to remote existing client private networks 230, with at least some of the computer network extensions 220 being configured to enable secure private access from one or more corresponding client private networks 230 over the public network 200 (e.g., via VPN connections established over interconnections 200a and 200b). In this example embodiment, the Manager module 210 assists in providing functionality of the CSP 205 to the remote clients, such as in conjunction with various other modules (not shown) of the CSP 205 and various computing nodes and networking devices (not shown) that are used by the CSP 205 to provide the private computer network extensions 220. In at least some embodiments, the CSP Manager module 210 may execute on one or more computing systems (not shown) of the CSP 205, and may provide one or more APIs that enable remote computing systems to programmatically interact with the module 210 to access some or all functionality of the CSP 205 on behalf of clients (e.g., to create, configure, and/or initiate use of private network extensions 220). In addition, in at least some embodiments, clients may instead manually interact with the module 210 (e.g., via a user interface provided by the module 210) to perform some or all such actions. The CSP 205 may also include an aggregator service 140, with functionalities as described in reference to FIG. 1.

The public network 200 may be, for example, a publicly accessible network of linked networks, possibly operated by distinct parties, such as the Internet. The remote client private networks 230 may each include one or more existing private networks, such as a corporate or other private network (e.g., home, university, etc.) that is partially or wholly inaccessible to non-privileged users, and that includes computing systems and/or other networked devices of a client. In an example embodiment, the client private networks 230 may include one or more VMIs (e.g., VMI1-VMI3) running in a private cloud 250 within the compute service provider 205. The aggregator service 140 and the policy applier 141 may be used to perform policy based data aggregation (e.g., as described in reference to FIG. 1) in connection with one or more of the VMIs running within the private cloud 250.

In the illustrated example, the provided network extensions 220 each include multiple computing nodes (not shown), at least some of which are provided by or otherwise under the control of the CSP 205, and each of the provided network extensions 220 may be configured in various ways by the clients for whom they are provided. Each of the network extensions 220 in the illustrated embodiment may be a private computer network that is accessible only by the client that creates it, although in other embodiments at least some computer networks provided by the CSP 205 for clients may be publicly accessible and/or may be standalone computer networks that are not extensions to other existing computer networks. Similarly, while the provided computer networks 220 in the example are extensions to remote client computer networks 230 that are private networks, in other embodiments the provided computer networks 220 may be extensions to client computer networks 230 that are not private networks.

Private access between a remote client private computer network 230 and corresponding private computer network extension 220 provided for a client may be enabled in various ways, such as by establishing a VPN connection or other secure connection between them that allows intercommunication over the public network 200 in a secure private manner. For example, the CSP 205 may automatically perform appropriate configuration on its computing nodes and other computing systems to enable VPN access to a particular private network extension 220 of a client, such as by automatically configuring one or more VPN mechanisms hosted by the CSP 205 (e.g., software and/or hardware VPN mechanisms), and/or may automatically provide appropriate configuration information to the client (e.g., credentials, access points, and/or other parameters) to allow a VPN mechanism hosted on the remote client private network 230 to establish the VPN access. After VPN access has been appropriately enabled and/or configured, a VPN connection may be established between the remote client private network and the private network extension, such as initiated by the client using IPsec ("Internet Protocol Security") or other appropriate communication technologies. For example, in some embodiments, a VPN connection or other secure connection may be established to or between networks that use MPLS ("Multi Protocol Label Switching") for data transmission, such as instead of an IPsec-based VPN connection.

In addition, in the illustrated embodiment, various network-accessible remote resource services 240 are available to remote computing systems over the public network 200, including to computing systems on the remote client private networks 230. The resource services 240 may provide various functionality to the remote computing systems, such as for at least some of the resource services 240 to provide remote computing systems with access to various types of computing-related resources. Furthermore, at least some of the private network extensions 220 that are provided by the CSP 205 may be configured to provide private or other specialized access to at least some of the remote resource services 240, with that provided access optionally appearing to computing nodes of the private network extensions 220 as being locally provided via virtual connections 215 that are part of the private network extensions 220, although the actual communications with the remote resource services 240 may occur over the public networks 200 (e.g., via interconnections 200b and 200c). Additional details regarding establishing and using such private or other specialized access to remote resource services are discussed in greater detail elsewhere.

As previously noted, the provided network extensions 220 may each be configured by clients in various manners. For example, in at least some embodiments, the CSP 205 provides multiple computing nodes that are available for use with network extensions provided to clients, such that each provided network extension 220 may include a client-configured quantity of multiple such computing nodes that are dedicated for use as part of the provided network extension. In particular, a client may interact with the module 210 to configure a quantity of computing nodes to initially be included in a computer network provided for the client (e.g., via one or more programmatic interactions with an API provided by the CSP 205). In addition, in at least some such embodiments, computing nodes may later be dynamically added to or removed from a provided computer network of a client (e.g., via one or more programmatic interactions with an API provided by the CSP 205), such as after the provided computer network has already been in use by the client (e.g., by indicating to initiate or terminate execution of particular programs on particular computing nodes). Furthermore, the CSP 205 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client.

In addition, in at least some embodiments, a client may interact with the module 210 to configure network addresses for a computer network provided for the client (e.g., via one or more programmatic interactions with an API provided by the CSP 205), and network addresses may later be dynamically added, removed or modified for a provided computer network of a client in at least some such embodiments, such as after the provided computer network has already been in use by the client. For example, if a particular provided computer network that is being configured is an extension to an existing remote client computer network, the client may specify one or more address ranges (e.g., a Classless Inter-Domain Routing ("CIDR") address block) or other groups of network addresses that are a subset of the network addresses used by the existing remote client computer network, such that the specified network addresses are used for the computing nodes of the provided computer network. Such configured network addresses may in some situations be virtual or private network addresses that are not directly addressable from computing systems on the public network 200 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 200 (e.g., a public network address that is a static Internet-routable IP address or other non-changing network address).

In other embodiments, the CSP 205 may automatically select network addresses to be used for at least some computing nodes of at least some provided computer network extensions, such as based on network addresses that are available for use by the CSP 205, based on selecting network addresses that are related network addresses used by remote existing computer networks corresponding to the provided computer networks, etc. In addition, in at least some embodiments in which the CSP 205 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CSP 205 manages the network addresses distinctly for each client, such that a first client may have a first computing node associated with a particular specified network address for the first client's provided computer network, while a distinct second client may have a distinct second computing node associated with the same particular specified network address for the second client's provided computer network.

Once network addresses are configured or otherwise determined for a provided computer network, the CSP 205 may assign the network addresses to various of the computing nodes selected for the provided computer network, such as in a random manner, by using DHCP ("Dynamic Host Configuration Protocol") or other techniques for dynamic assignment of network addresses, etc. In addition, even if public network addresses are used for a particular computer network, the CSP 205 may map one or more of those public network addresses for use in other manners, such as to use a particular public network address to act as an access mechanism for a particular remote resource service as described in greater detail elsewhere, so that communications sent to that particular public network address by computing nodes of that particular computer network will be forwarded to the corresponding remote resource service rather than to another computing system on the Internet or other network to which that particular public network address is assigned. FIG. 2B provides additional details regarding an example of using configured network addresses to route communications within a provided computer network.

In addition, in at least some embodiments, a client may interact with the module 210 to configure network topology information for a computer network provided for the client (e.g., via one or more programmatic interactions with an API provided by the CSP 205), and such network topology information may later be dynamically modified for a provided computer network in at least some such embodiments, such as after the provided computer network has already been in use by the client. For example, a client may specify particular types of networking devices (e.g., routers, switches, etc.) and/or other network devices or nodes (e.g., firewalls, proxies, network storage devices, printers, etc.) to be part of the provided computer network, and/or may specify subsets of the computing nodes of the provided computer network to be grouped together or that are to otherwise share common intercommunication characteristics (e.g., a particular subset of computing nodes that are part of a subnet for which intercommunications are not filtered and/or that are associated with a particular networking device).

In addition, the specified configuration information for a provided computer network may in at least some embodiments include routing information or other interconnectivity information between networking devices and/or groups of computing devices. Furthermore, in at least some embodiments, the CSP 205 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CSP 205 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; etc.).

As discussed in greater detail elsewhere, in at least some embodiments, the interconnections and intercommunications between computing nodes of a provided computer network are managed using an underlying substrate network of the CSP 205, and if so, some or all of the configured network topology information may be simulated in at least some such embodiments using the underlying substrate network and corresponding modules of the CSP 205. For example, each of the computing nodes provided by the CSP 205 may be associated with a node communication manager module of the CSP 205 that manages communications to and from its associated computing nodes. If so, firewall devices may be simulated by using the associated communication manager module for a computing node to disallow or otherwise handle communications to and/or from the computing node in a manner consistent with one or more simulated firewall devices. Such node communication manager modules may similarly simulate routers and subnets by controlling how and whether intercommunications are passed between computing nodes, and by responding to requests from computing nodes for information (e.g., ARP, or address resolution protocol, requests) with appropriate response information. One or more external communication manager modules of the CSP 205 may manage communications between the computing nodes provided by the CSP 205 and external computing systems, such as to similarly simulate firewall devices and enforce specified network access constraints, as well as to manage configured access mechanisms for remote resource services and secure connections to remote client private computer networks.

In addition, in at least some embodiments, a client may interact with the module 210 to configure various network access constraint information for a computer network provided for the client (e.g., via one or more programmatic interactions with an API provided by the CSP 205), and such network access constraint information may later be dynamically modified for a provided computer network in at least some such embodiments, such as after the provided computer network has already been in use by the client. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which private or other specialized access has been established, external to the provided computer network and any corresponding remote client computer network, etc.); types of other computing systems; etc. In addition, as discussed in greater detail elsewhere, in at least some embodiments a provided computer network may be configured to provide private or other specialized access to one or more remote resource services, such as via a configured access mechanism that is part of or otherwise local to the provided computer network. In a manner similar to that for network topology information and other routing information, the CSP 205 may enforce network access constraint information for provided computer networks in various manners. Additional details related to managing communications for provided computer networks in some embodiments are discussed below with respect to FIG. 3.

FIG. 2B illustrates additional details regarding an example computer network 220A that may be provided by the CSP 205 (or other embodiment of a compute service provider) for a client, with the provided computer network 220A in this example being a private network extension to a remote private computer network of the client, such as one of the remote private computer networks 230 of FIG. 2A. In this example, various connections and communication paths for the provided computer network 220A are shown in a conceptual manner to illustrate types of configurable network access constraints and network topology.

In particular, in FIG. 2B, the provided computer network 220A includes various computing nodes (or host server computers) provided by the CSP 205 that are located at a first geographical location 1 (or region 1) 260 (e.g., at a first data center at the geographical location 1 or region 1), with the various computing nodes being configured into logical groups 264, 265 and 266 in this example (e.g., to correspond to different subnets and/or associated configured networking devices, not shown). In this example, a single conceptual virtual router 262 is shown at geographical location 1 to control communications between those computing nodes and other computing systems, so as to illustrate different types of communications that may occur, although the provided computer network 220A may actually have multiple or no configured networking devices at geographical location 1, and the computer network 220A may be implemented by the configurable network service at the geographical location 1 in various manners, such as via multiple physical interconnected routers or other networking devices, by using an underlying substrate network and associated modules that control communications over the underlying substrate network, etc. In this example, the virtual router 262 operates in accordance with the configured information for the provided computer network 220A, including configured network topology information, configured private or other specialized access to remote resource services, and other configured network access constraint information, such as to route communications that are sent to network addresses within the provided computer network 220A to corresponding destination computing nodes on the provided computer network 220A, and to route other communications to other network addresses outside of the provided computer network 220A as appropriate. Furthermore, communications that are not permitted by configured firewall devices, configured network topology information, or other configured network access constraints may be blocked or otherwise managed by the virtual router 262.

In this example, the computer network 220A is provided for an example Client 1, and is a network extension to a remote computer network of Client 1. Client 1's remote computer network includes multiple computing systems (not shown) at a first remote location Site A 290, and the virtual router 262 is configured to communicate with those multiple computing systems via a virtual communication link 270 at the geographical location 1. For example, the provided computer network 220A may include one or more configured VPN connections to the multiple computing systems at Site A 290, and the communication link 270 may correspond to one or more such VPN connections. In addition, the remote computer network of Client 1 may optionally include computing systems at one or more other locations, such as the illustrated optional Site B 292, and if so the virtual router 262 may further be configured to communicate with those other computing systems at the other locations, such as via an optional virtual communication link 272 to Site B 292 (e.g., via one or more other configured VPN connections directly to Site 8).

When multiple VPN connections or other secure connections are used to remote computing systems of a remote computer network, each connection may correspond to a subset of the remote computing systems (e.g., by being associated with a subset of the network addresses of the remote computer network that correspond to those remote computing systems), so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Furthermore, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the provided computer network 220A may be configured to allow all, some or no communications between the computing nodes of the provided computer network 220A and other external computing systems that are generally accessible on the Internet 296 or other public networks. If at least some such external communications are allowed, the virtual router 262 may further be configured to communicate with those external multiple computing systems via an optional virtual communication link 278 of the provided computer network 220A, such as in conjunction with an optional virtual border router 255 for the provided computer network 220A. The virtual border router 255 may be physically implemented in various manners, such as by the CSP 205 using one or more actual firewall devices or border router devices that manage communications between external computing systems and the various computing nodes provided by the CSP 205 at geographical location 1 (e.g., actual devices that support numerous computer networks provided by the CSP 205 to clients that use those computing nodes of the CSP 205), by using an underlying substrate network and associated modules that control communications over the underlying substrate network (e.g., to prevent disallowed communications from being sent by computing nodes of the provided computer network 220a onto the substrate network), etc. Furthermore, the virtual border router 255 may further conceptually assist in managing other communications to other computing systems external to the provided computer network 220A, such as to the remote client computer network at Sites A and B, to one or more remote resource services, etc.

In addition, the provided computer network 220A may be configured to provide private or other specialized access to one or more remote resource services, such as by assigning one or more network addresses of the provided computer network 220A to represent those one or more remote resource services, and by optionally configuring particular actions to be taken for communications sent to those assigned network addresses. In this example, the virtual router 262 has been configured to provide local access to remote resource service 294 via a virtual communication link 274 of the provided computer network 220a. Thus, for example, if one of the computing nodes of the provided computer network 220*a* sends a communication to a particular network address of the provided computer network 220*a* that is mapped to the communication link 274, the virtual router may forward that communication to the remote resource service 294 external to the provided computer network 220*a* (e.g., via the Internet or other public networks). In other embodiments, the remote resource service 294 may implement an interface that is part of the CSP 205 or otherwise at the geographical location 1, and if so the communications sent to the particular network address of the provided computer network 220A that is mapped to the communication link 274 may instead be forwarded to that interface of the remote resource service for handling.

In addition, the virtual communication link 274 may be configured in at least some embodiments to manage communications sent via the link in various manners, such as to modify those communications in one or more manners before they are forwarded to the remote resource service 294, or to otherwise access the remote resource service 294 in a specialized manner. For example, in the illustrated embodiment, the virtual communication link 274 may be configured to correspond to a particular namespace within the remote resource service 294, with a subset of the computing-related resources provided by the remote resource service 294 being part of that namespace. Accordingly, the virtual communication link 274 may be configured to access resources within the particular namespace, such as by modifying or translating communications to use a name or other identifier associated with the particular namespace, by using a particular interface of the remote resource service that supports indicating a particular namespace, etc.

In addition, if the virtual communication link 274 is configured to correspond to a particular namespace or to otherwise correspond to a subset of the resources provided by the remote resource service 294, the provided computer network 220A may optionally be further configured to include one or more other virtual communication links that also correspond to the same remote resource service 294 but are configured to access the remote resource service 294 in other manners. For example, the provided computer network 220A may optionally include a distinct virtual communication link 276 that is configured to access the remote resource service 294 in a distinct manner than that of virtual communication link 274, such as to correspond to a distinct second namespace, to not correspond to any particular namespace, to use an identifier of a customer of the remote resource service 294 that is distinct from a customer identifier used for communication link 274, etc. In this example, the virtual communication links 274 and 276 are configured to use different identifiers (e.g., different namespace identifiers), which are represented in this example as ID 1 and ID 2 for the links 274 and 276, respectively. Thus, the computing nodes of the provided computer network 220*a* may be able to access different types of functionality from remote resource 294. Furthermore, while not illustrated here, the provided computer network 220A may be similarly configured to access one or more other remote resource services (not shown) using other virtual communication links to those other remote resource services.

In addition to or instead of configuring the virtual communication link 274 to access a particular namespace of the remote resource service 294, the virtual communication link may be configured in at least some embodiments to provide additional information to the remote resource service 294 to allow the remote resource service 294 to validate the location or other source of the communications as being the provided computer network 220*a*. For example, in the illustrated embodiment, the virtual communication link 274 may be configured to correspond to one or more particular identifiers or other access control indicators that are associated with the provided computer network 220*a* by the compute service provider or by the remote resource service 294,294, so that a subset of new and/or existing computing-related resources provided by the remote resource service 294 that are accessed via the virtual communication link 274 are associated with the access control indicator(s), for use by the remote resource service 294 in restricting access to those resources.

Accordingly, the virtual communication link 274 may be configured to use the specified additional indicator(s) associated with the provided computer network 220*a* in various manners, such as to modify communications to include the additional indicator(s), to send the additional indicator(s) along with the communications without modification of the communications, to use a particular interface of the remote resource service that supports including such additional indicator(s), etc. In addition, if the virtual communication link 274 is configured to correspond to one or more additional indicators, the provided computer network 220A may optionally be further configured to include one or more other virtual communication links that also correspond to the same remote resource service 294 but are configured to access the remote resource service 294 in other manners. For example, the provided computer network 220A may optionally configure the distinct virtual communication link 276 to access the remote resource service 294 without using any additional indicators (e.g., to provide the same access to the remote resource service 294 as would otherwise be publicly available), to use one or more other additional access control indicators that are distinct from those used with virtual communication link 274, to use an identifier of a customer of the remote resource service 294 that is distinct from a customer identifier used for virtual communication link 274, etc. Furthermore, while not illustrated here, the provided computer network 220*a* may be similarly configured to access one or more other remote resource services (not shown) using other virtual communication links to those other remote resource services, such as other virtual communication links that are configured to use the same one or more additional indicators as virtual communication link 274, or that are otherwise configured.

In the illustrated embodiment, in addition to the computing nodes of the CSP 205 at geographical location 1, the provided computer network 220A may further include computing nodes 284 provided by the CSP 205 that are located at a second geographical location 2 280 (e.g., at a distinct second data center at the geographical location 2). Accordingly, the virtual router 262 may be configured to include an optional virtual communication link 268 to the portion of the provided computer network 220*a* at the geographical location 2. In this example, the portion of the provided computer network 220A at the geographical location 2 similarly is illustrated with a conceptual virtual router 282 to manage communications to and from the computing nodes 284, including to communicate with the portion of the provided computer network 220A at the geographical location 1 via a virtual communication link 288. Such communications between computing nodes of the CSP 205 at different geographical locations may be handled in various manners in various embodiments, such as by sending the communications over the Internet or other public networks (e.g., as part of a secure tunnel, such as that uses encryption supported by the CSP 205), by sending the communications in a private secure manner (e.g., via a dedicated lease line between the geographical locations), etc. In addition, while not illustrated here, the portion of the provided computer network 220A at the geographical location 2 may similarly include some or all of the same types of other virtual communication links illustrated for the portion at geographical location 1, such as to a remote client private network (e.g., via one or more VPN connections distinct from any VPN connections to the geographical location 1), to remote resource services, to the Internet, etc.

It will be appreciated that the example provided computer network 220A of FIG. 2B is included for exemplary purposes, and that other computer networks provided by the CSP 205 for clients may not include all of the types of configured communications links and network topology information, and/or may include other types of configured communications links and network topology information that is not illustrated here. For example, in some embodiments and situations, a provided computer network may include configured devices and other resources in addition to or instead of computing nodes, and if so, each such other resource may optionally be assigned a network address of the provided computer network. Furthermore, the conceptual devices and communication links illustrated in FIG. 2B may be implemented using a variety of types of underlying physical devices, connections and modules. In addition, while not illustrated here, clients may perform a variety of other types of interactions with remote resource services, whether from provided computer networks or instead other remote computing systems, such as to subscribe/register to use resource, receive/create various credentials (e.g., user IDs, passwords, etc.), create resources and/or namespaces from other remote computing systems (e.g., that are part of a remote private corporate network) that are later accessed from a provided computer network (e.g., a network extension to the private corporate network), etc.

In an example embodiment, the provided computer network 220A may include one or more VMIs (e.g., VMI1-VMI5) running in hosts 264-265. Additionally, at least a portion of the VMIs (e.g., VMI2-VMI5) may be associated with a private cloud 251 within the geographical location (or region) 260. In this regard, the region 260 may be an isolated region, similar to region 102 in FIG. 1). The aggregator service 140 and the policy applier 141 may be communicatively coupled to the provided computer network 220A (including the private cloud 251 within region 260), and may be used to perform policy based data aggregation (e.g., as described in reference to FIG. 1) in connection with one or more of the VMIs running within the private cloud 251. In this regard, the policy applier 251 may be located within the private cloud 251 to handle declassification/filtering of sensitive data, generating output data files after applying one or more declassification/filtering rules, and making the output file available for access from outside the private cloud 251.

FIG. 3A is a diagram of a private cloud environment using a data aggregator service with a plurality of policies for filtering data files, in accordance with an example embodiment of the disclosure. Referring to FIG. 3A, one or more of the host server computers 306, . . . , 310 within the service provider 100 may be associated with at least one private cloud (e.g., 302, . . . , 304). For example, host servers 306, . . . , 308 may be associated with a private cloud 302. Host server 310 may include a plurality of VMIs (e.g., 312, . . . , 314) running therein, and host server 310 may be associated with a private cloud 304. In other instances, only a certain subset of VMIs running on a host server computer may be associated with a separate private cloud within the service provider 100.

The aggregator service 140, together with the various policy appliers (e.g., 141, . . . , 143 in each private cloud, respectively) may be configured to perform policy based data aggregation in connection with at least one data file maintained by one or more of the host servers 306, . . . , 310 (e.g., a file with sensitive data generated and maintained by a VMI running on a host server) within at least one of the private clouds 302, . . . , 304. In accordance with an example embodiment of the disclosure, the policy 142 may include a plurality of policies 320, . . . , 324 with rules (e.g., anonymization and/or aggregation rules), which may be used by the policy appliers 141, . . . , 143 of the aggregator service 140 to generalize sensitive data within a file (i.e., filter sensitive data by performing anonymization and/or tokenization of the sensitive data) and generate an output (e.g., non-confidential or declassified) file. For example, the policy 142 may include a global policy 320, which may provide rules used by the aggregator service 140 to provide policy based data aggregation in connection with any of the private clouds 302, . . . , 304. The policy 142 may further include policy 322, which may provide rules used by the aggregator service 140 and the policy appliers 141, . . . , 143 to provide policy based data aggregation in connection with a specific private cloud (e.g., private clouds 302). The policy 142 may also include policy 324, which may provide rules used by the aggregator service 140 to provide policy based data aggregation in connection with a specific VMI running on a host server (e.g., VMI 312 running on host 310 within the private cloud 304).

FIG. 3B is a block diagram illustrating anonymization and tokenization of file data during a policy based data aggregation, in accordance with an example embodiment of the disclosure. Referring to FIGS. 1 and 3B, there is illustrated an example embodiment for file 112. More specifically, file 112 may be a log file, and the sensitive data 113 may include fields 1-4. More specifically, fields 1 and 3 indicate client names for clients 1 and 2, and fields 2 and 4 indicate IP addresses for clients 1 and 2, respectively.

During an example policy based data aggregation, the sensitive data 113 within the log file 112 may be anonymized based on policy 142 to generate the anonymized file 330 as the output file 116. As seen in FIG. 3A, the anonymized file 330 may be generated by the policy applier 141 by replacing the sensitive data 113 of fields 1-4 with the symbols XY, AB, CD, and EF, respectively, if "Client", "Name", "IP Address" and the actual address fields are all anonymized. As an alternative, only the actual client name and the actual IP address may be anonymized, and the result of such anonymization process is reflected in the parenthesis in FIG. 3B).

During another example policy based data aggregation, the sensitive data 113 within the log file 112 may be tokenized based on policy 142 to generate the tokenized file 332 as the output file 116. As seen in FIG. 3A, the tokenized file 332 may be generated by the aggregator service 140 by replacing the sensitive data 113 of fields 1-4 with tokens that are indicative of, for example, the type of data within the field. More specifically, the client names of fields 1 and 3 are replaced by tokens NAME1 and NAME2. Similarly, the IP addresses of fields 2 and 4 are replaced by tokens IP1 and IP2. In this regard, even though the specific names and IP addresses are filtered out of the sensitive data 113, the tokenized file 332 still indicates the type of sensitive data (i.e., one can still notice that fields 1-4 include two different names and two different IP addresses).

FIG. 4 is an example system diagram showing a plurality of virtual machine instances running in a multi-tenant environment using an aggregator service, in accordance with an example embodiment of the disclosure. More specifically, FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients (e.g., tenants or customers).

In an example embodiment, the compute service provider 400 can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). In this regard, the plurality of customers (e.g., multiple enterprises) can rent resources, such as server computers, within the multi-tenant environment.

Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked customer devices, such as desktop computers, laptops, tablets, smartphones, etc. running web browsers or other lightweight customer applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

The compute service provider 400 may also comprise an aggregator service 440 including one or more policy applier modules within each isolated region or private cloud (e.g., 141). As used herein, the term "aggregator service" includes the functionalities provided by a policy applier as explained for example in reference to FIG. 1. The aggregator service 440 and the policy applier (e.g., 141) may comprise suitable circuitry, logic, and/or code and may be operable to perform the functionalities described herein (e.g., similar to the functionalities of the aggregator service 140 and policy applier 141 described in reference to FIGS. 1-3B). The aggregator service 440 may be implemented as a stand-alone service within the provider 400, as a dedicated server (similar to the servers 402A-402D), and/or may be implemented as part of the server computer 404 that performs management functions (or as part of the individual server computers 402A-402D, as explained above). For example, the aggregator service 440 may be implemented as a software application running on the server's operation system (e.g., as part of the management component 410.

In an example embodiment, each of the server computers 402A-402D may also comprise a log file (e.g., 442A-442D) and performance metric file (e.g., 441A-441D), which may be similar to the file 112 including sensitive data 113 (FIG. 1). Additionally, one or more of the instances 406 may be associated with (i.e., located with) one or more private clouds. For example, instances (or VMIs) 406A within server computer 402A may be located within private cloud 403, and instances 406B-406C within server computers 402B-402C may be located within private cloud 405. The aggregator service 440 together with one or more policy appliers within each isolated region or private cloud (e.g., policy applier 141 in isolated region 405) may be configured to perform policy based data aggregation on one or more files (e.g., 442-441) with sensitive data based on policy rules associated with, for example, private clouds 403-405.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the service aggregator 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component 410 can further include a policy document (e.g., 564 in FIG. 5) to implement customer policies, such as policies related to the aggregator service 440 and any associated policy appliers (e.g., 141).

The server computer 404 may further comprise memory 452, which may be used as processing memory by the aggregator service 440. An auto scaling component 612 can scale the instances 406 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 402 or other computing devices. The auto scaling component 612 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 443 so that end-users can access the compute service provider 400. It should be appreciated that the network topology illustrated in FIG. 4 has been simplified and that many more networks and networking devices can be utilized to interconnect the various computing systems disclosed herein.

Figure 5:
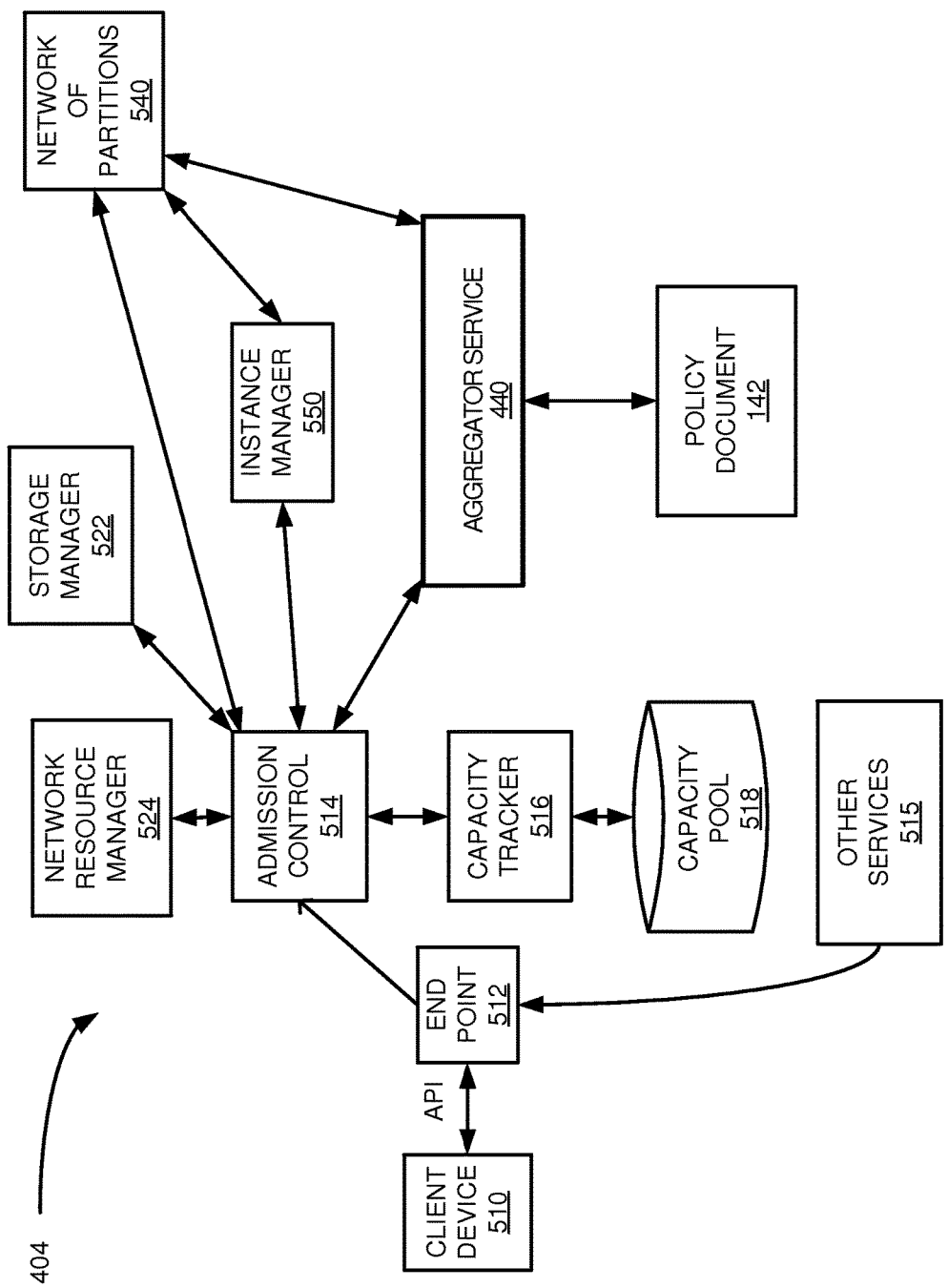
FIG. 5 shows further details of an example system including a plurality of management components associated with a control plane, which may be used in a policy based data aggregation according to one embodiment.

FIG. 5 shows further details of an example system including a plurality of management components associated with a control plane, which may be used in a policy based data aggregation according to one embodiment. More specifically, FIG. 5 illustrates in further detail the management component 410 within the management server computer 404, which may implement the aggregator service 440 within the multi-tenant environment of the compute service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the compute service provider 400 through an end point 512, which can be a DNS address designed to receive and process application programming interface (API) requests. In particular, the end point 512 can be a web server configured to expose an API. Using the API requests, a customer device 510 can make requests to implement any of the functionality described herein. Other services 515, which can be internal to the compute service provider 400, can likewise make API requests to the end point 512. For example, the customer device 510 may use the API requests to communicate a customer request (e.g., file request 146) associated with performing policy based data aggregation by the aggregator service (e.g., 140 or 440). The API requests from the client can pass through the admission control 514 and onto the aggregation service 440 in order to access the policy document 142 and/or to request aggregation-related services.

Other general management services that may or may not be included in the compute service provider 400 (and/or within the management component 410) include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The aggregator service 440 (together with one or more policy appliers within each isolated region or private cloud) may perform the policy based data aggregation functionalities described herein (e.g., as described in reference to aggregator service 140 in FIGS. 1-3B). The aggregator service 440 may communicate with the admission control 514 to receive API requests for files (e.g., file request 146) and with the network of partitions 540 to access host servers and/or VMIs and perform rule based data aggregation functions (e.g., filter sensitive data using one or more anonymization and/or tokenization rules).

Figure 6:
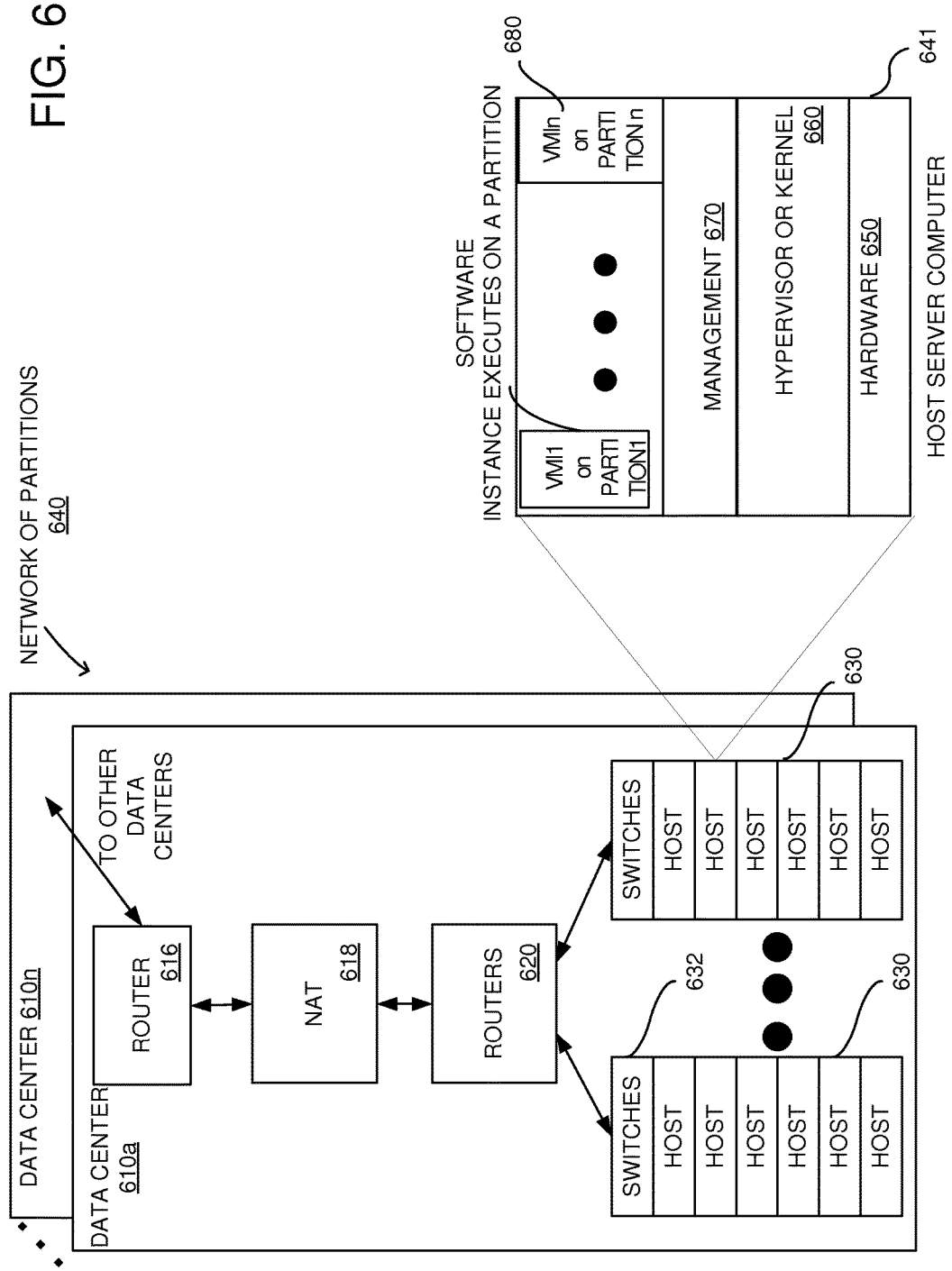
FIG. 6 shows an example of a plurality of host computers, routers and switches, which are hardware assets used for running virtual machine instances—with the host computers having aggregator-related functionalities that may be configured according to one embodiment of the disclosure.

FIG. 6 shows an example of a plurality of host computers, routers and switches, which are hardware assets used for running virtual machine instances—with the host computers having aggregation-related functionalities that may be configured according to one embodiment of the disclosure. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650, which may include a network interface card, one or more CPUs, memory, and so forth (not illustrated in FIG. 6). Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions.

Figure 7:
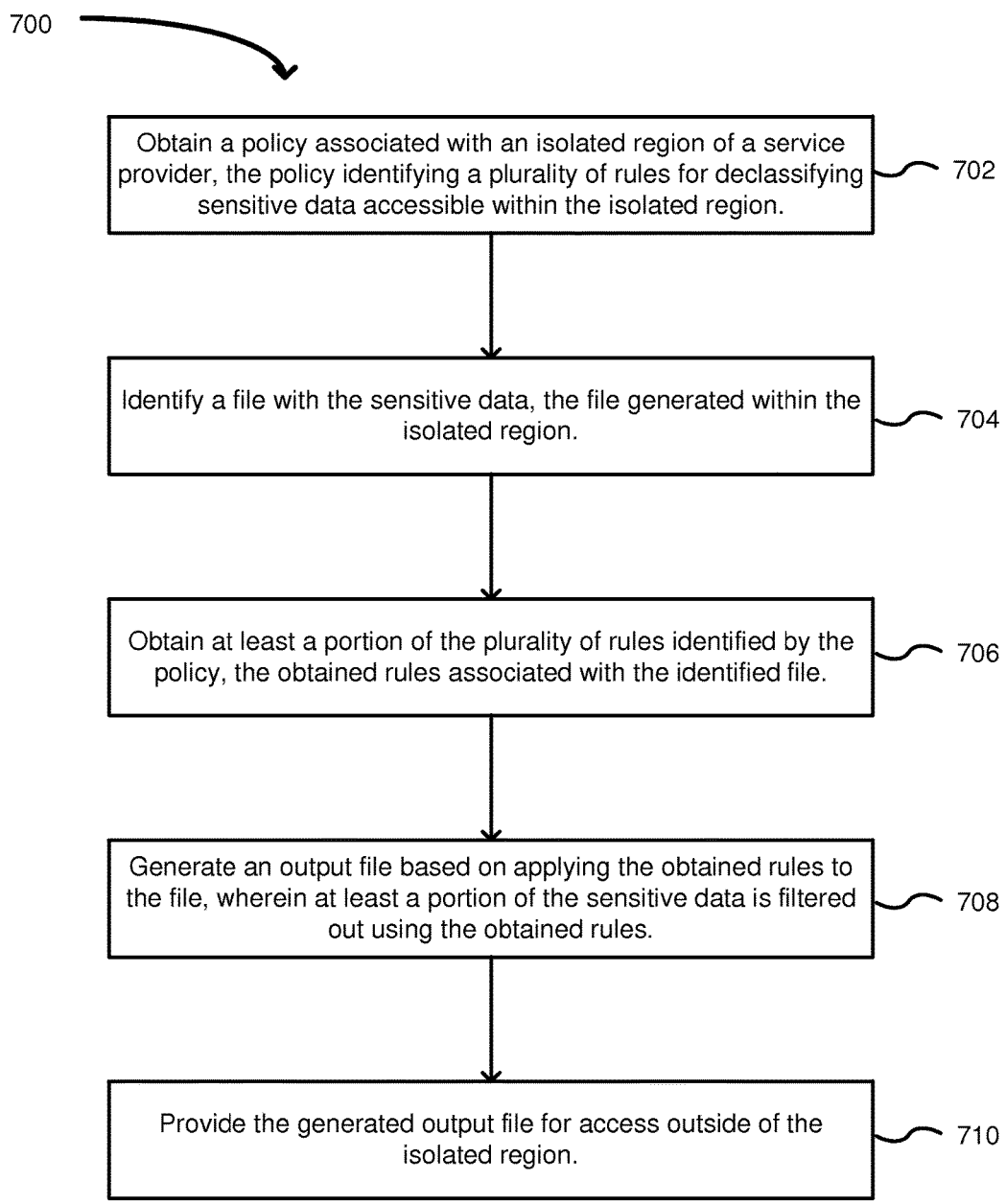
FIG. 7 is a flowchart of an example method of data aggregation of non-confidential data, in accordance with an embodiment of the disclosure.

FIG. 7 is a flowchart of an example method of data aggregation of non-confidential data, in accordance with an embodiment of the disclosure. Referring to FIGS. 1 and 7, the example method 700 may start at 702, when a policy associated with an isolated region (e.g., 102) of a service provider may be obtained. For example, the policy applier 141 of the aggregator service 140 may obtain the policy 142, which may be associated with the isolated region 102 of the service provider 100. The policy 142 may identify a plurality of rules for declassifying sensitive data accessible within the isolated region (e.g., rules for declassifying or filtering sensitive data 113 (e.g., confidential or secret data) within data file 112). At 704, the policy applier 141 of the aggregator service 140 may identify a file with sensitive data (e.g., 112), the file being generated within the isolated region. At 706, the policy applier 141 may obtain at least a portion of the rules within policy 142, which rules are associated with the identified file 112. At 708, the policy applier 141 may generate an output file (e.g., 116) based on applying the obtained rules to the file (e.g., 112), where at least a portion of the sensitive data (e.g., 113) is filtered out using the obtained rules. At 710, the policy applier 141 may provide the generated output file (e.g., 116) for access outside of the isolated region (e.g., the output file 116 may be stored in network storage 130 or otherwise made available for access by any of the remaining regions 110, . . . , 111).

Figure 8:
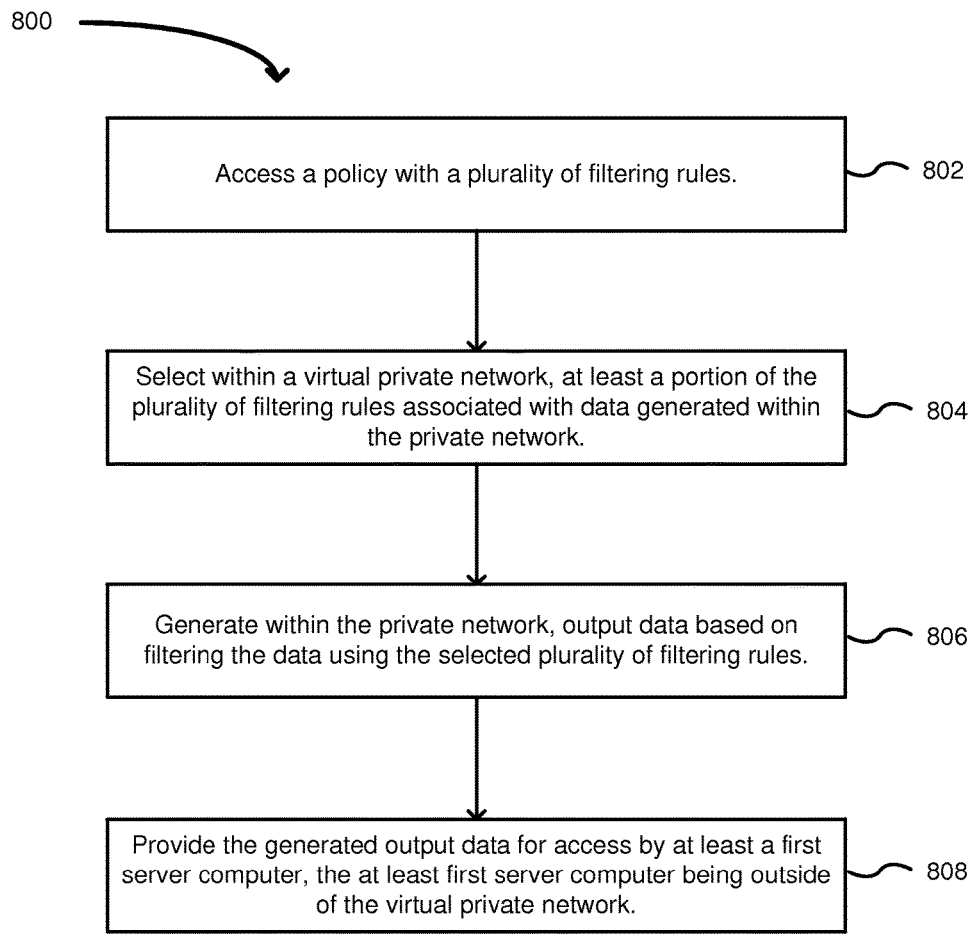
FIG. 8 is a flowchart of another example method of data aggregation of non-confidential data in a multi-tenant network of a compute service provider, in accordance with an embodiment of the disclosure.

FIG. 8 is a flowchart of another example method of data aggregation of non-confidential data in a multi-tenant network of a compute service provider, in accordance with an embodiment of the disclosure. Referring to FIGS. 1-3B and 8, the example method 800 may start at 802, when the policy applier 141 of the aggregator service 140 of the service provider 100 may access a policy (e.g., 142) with a plurality of filtering rules. The filtering rules may be associated with one or more files generated by a server computer (e.g., file 112 is generated by host server 108). The server computer (e.g., host server 108) is associated with a virtual private network within the service provider (e.g., host server 108 may be within an isolated region 102 or within a private network (e.g., private cloud 250 or 251). At 804, the policy applier 141 may select at least a portion of the plurality of filtering rules of policy 142, where the selected rules may be associated with files generated by the server 108. The plurality of filtering rules (e.g., rules associated with one or more of policies 320, . . . , 324 in FIG. 3A) may be used for filtering data (e.g., anonymizing and/or tokenizing sensitive data as illustrated in FIG. 3B) generated within the virtual private network (e.g., file 112 with sensitive data 113 within the isolated region 102, or any other type of data that includes sensitive data). At 806, the policy applier 141 may generate output data (e.g., output file 116) based on filtering the data (e.g., file data 112) using the plurality of filtering rules (e.g., the rules within policy 142). At 808, the policy applier 141 may provide the generated output data (e.g., output file 116) for access by at least a second server computer (e.g., 110). The at least second host server computer being outside of the virtual private network (e.g., host server computers 110 are located within non-isolated region 104 within the service provider 100).

Figure 9:
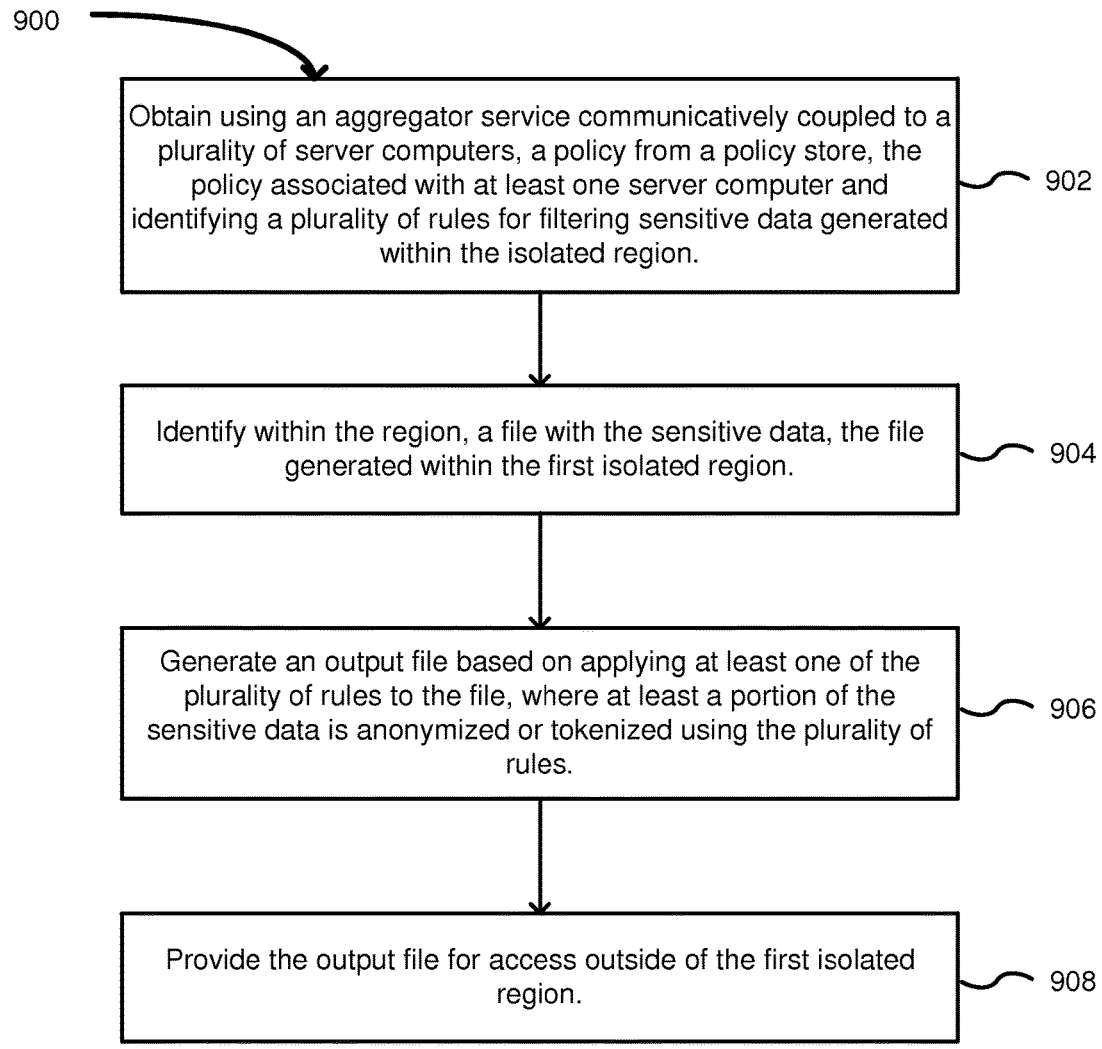
FIG. 9 is a flowchart of yet another example method of data aggregation of non-confidential data, in accordance with an embodiment of the disclosure.

FIG. 9 is a flowchart of yet another example method of data aggregation of non-confidential data, in accordance with an embodiment of the disclosure. Referring to FIGS. 1-3B and 9, the example method 900 may start at 902, when the policy applier 141 of the aggregator service 140 may obtain a policy from a policy store (e.g., 322 as part of 142, where the policy 142 may be referred to as the policy store, or a storage location storing the policy 142 may be referred to as the policy store) associated with at least one server computer (e.g., the server may be 306 within private cloud 302). The policy (e.g., 322) may identify a plurality of rules for declassifying or filtering sensitive data generated within (or accessible within) the isolated region (e.g., private cloud 302). At 904, the policy applier 141 may identify a file with the sensitive data (e.g., file 112 may be generated by host server 306 and file 112 may include sensitive data 113). The file (e.g., 112) may be generated within the isolated region (e.g., private cloud 302). At 906, the policy applier 141 may generated a first output file (e.g., 116) based on applying at least one of the plurality of rules to the file. At least a portion of the sensitive data (e.g., 113) may be anonymized or tokenized using the plurality of rules (e.g., anonymization and/or tokenization rules within the policy 322). At 908, the policy applier 141 may provide the first output file (e.g., 116) for access outside of the first isolated region (e.g., outside of the private cloud 302).

Figure 10:
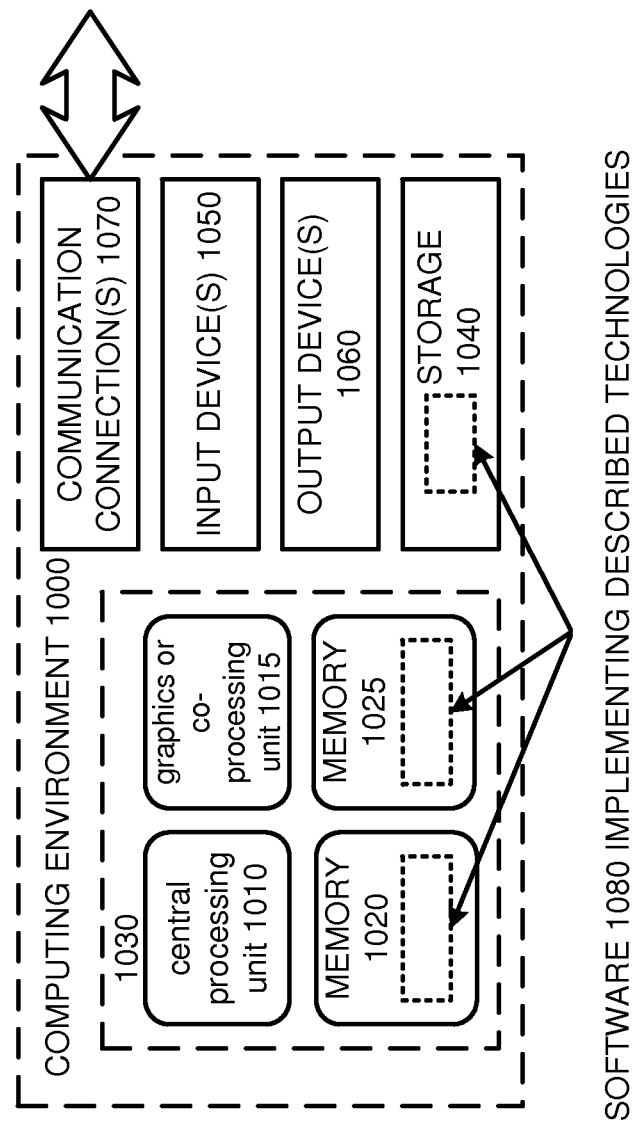
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for data aggregation of declassified sensitive data, comprising:
receiving a request for a file stored on a first server computer in an isolated network region of a service provider, the request being received from a second server computer;
obtaining, by the first server computer, a policy associated with the isolated network region of the service provider, the policy identifying a plurality of rules for declassifying sensitive data accessible within the isolated network region;
identifying the file with the sensitive data on the first server computer;
obtaining, by the first server computer, at least a portion of the plurality of rules identified by the policy, the obtained rules associated with the identified file;
transforming, using the first server computer on which the file is stored, the identified file to an output file by replacing sensitive information with non-sensitive information, which is indicative of a type of sensitive information, using the obtained portion of the plurality of rules, wherein the sensitive information includes identification information of a customer associated with the file and the non-sensitive information includes performance metrics associated with the architecture of the first server computer; and,
transmitting the output file outside of the isolated network region to the second server computer as a response to the request for the file, wherein the output file includes the performance metrics.

2. The method according to claim 1, wherein the sensitive data is inaccessible by at least another region of the service provider.

3. The method according to claim 1, wherein the file is a log file and the method further comprises:
generating the output file based on performing one or both of anonymizing and tokenizing operations on the file, the anonymizing and tokenizing operations specified by the obtained rules.

4. The method according to claim 1, comprising:
storing the output file in a network storage location accessible by at least a first host computer within the isolated region and at least a second host computer in at least another non-isolated network region of the service provider.

5. The method according to claim 1, wherein the portion of the plurality of rules comprise:
at least a first rule for tokenizing a specific IP address by replacing the specific IP address with a token that does not reveal the specific IP address; or
at least a second rule for tokenizing a plurality of IP addresses with a corresponding plurality of unique tokens.

6. A computer-readable storage including instructions thereon for executing a method for data aggregation in a multi-tenant network of a service provider, the method comprising:
receiving a request for a file including sensitive data stored on a first server computer in an isolated region from a second server computer;
accessing a policy with a plurality of filtering rules by the first server computer;
selecting within a virtual private network, at least a portion of the plurality of filtering rules, the selecting based on the sensitive data;
transforming, within the virtual private network, the file into output data based on filtering the sensitive data using the selected plurality of filtering rules, wherein the transforming includes replacing identification information of a tenant associated with the sensitive data with tokens that are indicative of generic identification information and wherein the transforming allows performance metrics associated with an architecture of the first server computer to be included in the output data;
transmitting the generated output data, including the performance metrics, to the second server computer, which is outside of the isolated region; and
storing the output data on the second server computer.

7. The computer-readable storage of claim 6, further including:
providing authorization to the second server computer for accessing the generated output data from within the virtual private network.

8. The computer-readable storage of claim 6, wherein the method further comprises:
filtering out the sensitive data within the file using the selected plurality of filtering rules.

9. The computer-readable storage of claim 6, further including:
filtering the sensitive data using at least one anonymization rule within the plurality of filtering rules, the at least one anonymization rule associated with replacing at least a portion of the data with anonymous data.

10. The computer-readable storage of claim 6, further including:
filtering the sensitive data using at least one tokenization rule within the plurality of filtering rules, the at least one tokenization rule associated with replacing at least a portion of data within the file with token data indicating at least a data type of the replaced data.

11. The computer-readable storage of claim 6, wherein the filtered data comprises at least one of the first server computer settings, the first server computer IP address, customer account identification, virtual machine instance identification, and customer email address.

12. The computer-readable storage of claim 6, wherein the sensitive data comprises file data and at least a portion of the plurality of filtering rules are associated with filtering the sensitive data from one or more files of a pre-determined file type, the one or more files generated within the virtual private network.

13. The computer-readable storage of claim 6, wherein the policy comprises filtering rules associated with at least a third server computer outside the virtual private network.

14. The computer-readable storage of claim 13, further including:
updating the plurality of filtering rules within the policy to include at least one or more filtering rules associated with data generated by at least one virtual machine instance running on the third server computer.

15. A system for data aggregation in a distributed system of a compute service provider, the system comprising:
a plurality of server computers disposed among a plurality of isolated regions of the compute service provider coupled together through a network, wherein:
at least a portion of the server computers for executing a plurality of virtual machine instances associated with a customer account;

at least one server computer of the plurality of server computers associated with an isolated region of the plurality of isolated regions of the compute service provider;

a policy store operable to store a plurality of policies for filtering data generated within at least one of the plurality of isolated regions of the compute service provider; and an aggregator service communicatively coupled to the plurality of server computers and the policy store, the aggregator service operable to:

obtain a policy from the policy store, the policy associated with the at least one server computer and identifying a plurality of rules for filtering sensitive data generated within the isolated region;

identify within the isolated region, a file with the sensitive data, the file generated within the isolated region;

retrieve at least one of the plurality of rules based on the identified file;

generate an output file based on applying the at least one of the plurality of rules to the file, wherein at least a portion of the sensitive data is one of anonymized or tokenized using the plurality of rules so that a type of the sensitive data can be identified without the sensitive data, and wherein the output file includes performance metrics associated with an operation of hardware on the at least one server computer; and store the output file on the at least one server computer.

16. The system of claim 15, wherein the aggregator service is operable to:
store the output file in network storage accessible from at least another one of the plurality of isolated regions.

17. The system of claim 16, wherein the aggregator service is operable to:
filter the file using at least one anonymization rule within the plurality of rules, the at least one anonymization rule associated with replacing at least a portion of the sensitive data with anonymous data; or
filter the file using at least one tokenization rule within the plurality of rules, the at least one tokenization rule associated with replacing at least a portion of the sensitive data with token data indicating at least a data type of the replaced data.

18. The system according to claim 15, wherein the file is a log file generated by the at least one server computer.

19. The system according to claim 15, wherein the file is inaccessible to at least a second server computer within another one of the plurality of isolated regions.

* * * * *